United States Patent Office 2,708,009
Patented May 10, 1955

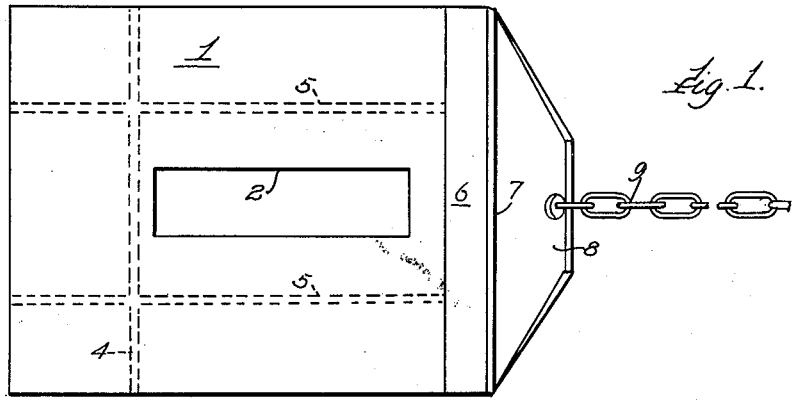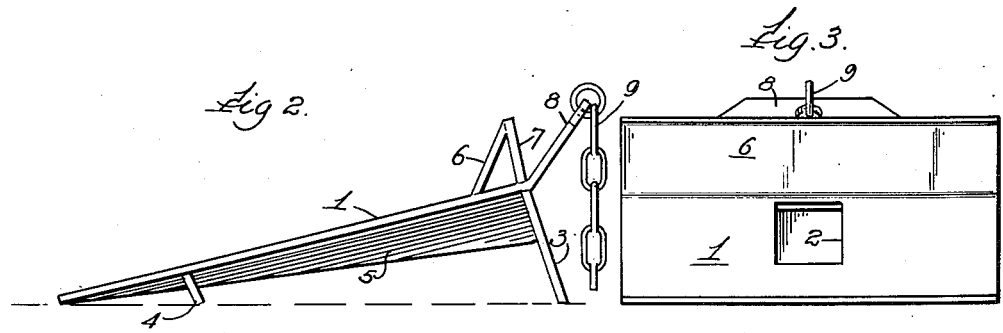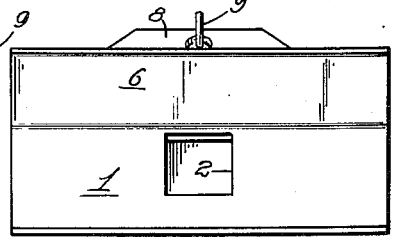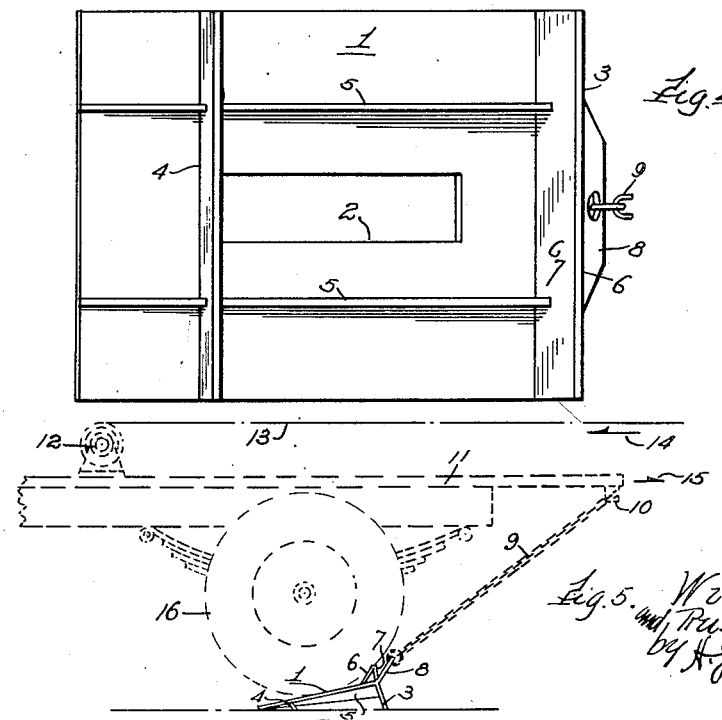

---

2,708,009

VEHICLE WHEEL LIFT AND ANCHOR

Will H. Allison, Shullsburg, and Russel T. Wilson, Benton, Wis.

Application August 12, 1952, Serial No. 303,944

1 Claim. (Cl. 188—4)

This invention relates to improvements in vehicle anchors and more particularly to a truck wheel lift and anchor for anchoring a winch truck or wrecker truck while a load is being lifted by the truck. The instant invention is adapted particularly for use when a vehicle has been damaged, as in a collision, or when same is parked or "stored" indefinitely on a thoroughfare, or otherwise incapacitated and it is desired to tow the vehicle with one end lifted clear of the road. On such occasions the winch truck or wrecker truck may shift its position more or less, under load, with the possibility of damage to the truck and/or vehicle or injury to the truck operator or assistant. The instant device avoids this possibility.

A further object is to provide a device of this type of simple construction and light weight that is inexpensive to manufacture, durable and efficient in operation.

The foregoing and other objects and novel features of our invention will be more clearly and fully set forth in the following specification, defined in the claim and illustrated in the accompanying drawing forming part of this disclosure, wherein:

Fig. 1 is a top plan view of an anchor according to the instant invention.

Fig. 2 is a side elevational view of the anchor.

Fig. 3 is an end elevational view of same.

Fig. 4 is an inverted plan view of the anchor, and,

Fig. 5 is a diagrammatic view showing the application of the anchor to a truck, the latter shown in broken lines.

The instant anchor is made desirably of what is generally known as 19-lb. soft steel plate and that may be of one piece construction, or of a platform with parts welded thereto and provided with a length of common chain.

The reference numeral 1 denotes the platform approximately rectangular in shape and formed axially with an elongated perforation 2 the sides of which are substantially equal distances from the adjacent lateral edges of the platform, the width of said perforation being slightly in excess of the width of any conventional truck wheel or tire.

At one end of the platform approximately at right angles thereto and extending from side to side thereof therebeneath is the rib 3, the height of said rib being substantially one-quarter the length of said platform. Spaced from the rib 3 and parallel thereto and disposed inwardly from the opposite end of said platform is the shallow rib 4 of such height that with the ribs 3, 4 resting upon level ground the free end of said platform will contact the ground.

As illustrated in the drawing, the perforation 2 is a longitudinal opening in the platform 1 substantially centered with respect to the side edges of the platform 1 but positioned slightly forwardly of the holding rib 4 and ending closer to the raised frontal edge of the platform 1 than to the lower opposite edge of the platform 1 (note Figures 1 and 3). The ribs 5, by reason of their increasing depth (as illustrated in Fig. 2), extending from the lower or back edge to the forward or frontal edge of platform 1, in conjunction with the anchoring or holding ribs 3 and 4 provide a balanced wheel lifting platform.

Extending longitudinally of the under side of said platform from end to end upon opposite sides of said perforation are the long ribs 5, 5, said ribs reduced in width from the elevated end of said platform to the free end thereof to provide ground clearance. Welded to or integral with the top face of said platform at the elevated end thereof and extending thereacross and adjacent one end of the perforation 2 is the pillow having a tread face 6 and support face 7, the face 7 normal to said platform, the face 6 at an obtuse angle thereto. Extending outwardly and upwardly from the elevated end of platform 1 at an acute angle to the pillow face 7 is the extension 8 to which a length of chain 9 is secured that at its opposite end is secured to a stud 10, or the like, welded or otherwise made fast to the rear end of the truck 11, or if desired the stud may be welded to the front bumper of the truck.

Arranged upon the truck is the conventional winch 12 with cable 13 running to the load, the arrow 14 denoting the direction of pull by the winch and the arrow 15 the direction of pull by the load upon the truck. In use the truck is moved to such position as to run the wheel 16 upon the anchor platform and drop the wheel partially into the rectangular wheel receiving opening 2, the size of this opening being such that the wheel will be supported by the front and rear edges of the opening 2 at a slight distance above the ground with the tire bearing against the pillow 6, 7. The weight of the truck is such as to cause the ribs 3, 4 to bite into the ground thus positively locking the anchor against longitudinal movement in the direction of arrow 15 or toward the load.

While the invention has been described along specific lines, various changes or refinements falling within the scope of the appended claim may be made without departing from the spirit of the invention and reservation is made of same.

What is claimed is:

A wheel lift anchor for a wrecker and winch truck comprising an inclined flat surfaced substantially rectangular platform having a raised front end and a lower back end adapted to be positioned against the ground, said platform having an elongated rectangular wheel receiving opening formed therein, said opening being substantially centered at a forward position in said platform, the sides of said opening being positioned in said platform at substantially equal distances from the adjacent lateral edges of said platform and spaced apart to receive lateral portions of a tire mounted on said wheel therebetween, the front and rear edges of said opening being spaced apart to support said tire at a slight distance above the ground, a front rib at the front end of said platform in front of said opening and extending downwardly at right angles from side to side of said platform for a distance of substantially one-quarter of the length thereof, a shallow second rib spaced inwardly between the said low back end of said platform adjacent the rear of said opening and extending downwardly in parallel relationship to the said front rib at the front end of said platform, a pair of downwardly spaced ribs of increasing depth throughout their length extending from the said lower back end to the said raised front end of said platform, a support extending upwardly across and normal to the said front end of said platform, a tread face held by said support at an obtuse angle to said platform and spaced forwardly from said opening, a securing plate extending outwardly and upwardly from said front end of said platform at an acute angle to the said support, and chain means secured to the said securing plate for attachment of said wheel lift anchor to a said wrecker and winch truck.

References Cited in the file of this patent

UNITED STATES PATENTS

| | | |
|---|---|---|
| 698,231 | Starzman | Apr. 22, 1902 |
| 733,543 | Denson | July 14, 1903 |
| 1,065,518 | Gammelin | June 24, 1913 |
| 1,148,047 | Ray | July 27, 1915 |
| 2,376,318 | Adkisson | May 15, 1945 |

FOREIGN PATENTS

| | | |
|---|---|---|
| 35,784 | Germany | June 12, 1886 |
| 405,900 | France | Nov. 25, 1909 |
| 411,814 | France | Apr. 15, 1910 |